United States Patent [19]

Vicard

[11] 4,017,390
[45] Apr. 12, 1977

[54] METHOD FOR SEPARATING SOLID POLLUTANTS FROM FLUIDS

[75] Inventor: Jean-Francois Vicard, Lyon, France

[73] Assignee: Societe Lab, Saint Dider Au Mont D'or, France

[22] Filed: May 28, 1975

[21] Appl. No.: 581,519

[30] Foreign Application Priority Data

June 7, 1974 France .............................. 74.20622

[52] U.S. Cl. ......................... 210/42 R; 204/180 R; 210/73 R; 210/243; 210/304; 210/512 M
[51] Int. Cl.² ......................................... C02B 1/82
[58] Field of Search .......... 210/243, 311, 512, 304, 210/42 R, 73 R, 77, 78; 204/186, 302, 180 R; 55/124, 127, 337–339

[56] References Cited

UNITED STATES PATENTS

| | | | |
|---|---|---|---|
| 3,273,317 | 9/1966 | Vicard | 55/127 |
| 3,314,872 | 4/1967 | Waterman et al. | 204/302 |
| 3,481,474 | 12/1969 | Paulson | 210/304 |
| 3,497,060 | 2/1970 | Tra et al. | 210/304 |
| 3,507,397 | 4/1970 | Robinson | 210/512 R |
| 3,585,122 | 6/1971 | King | 204/186 |
| 3,698,555 | 10/1972 | Conner | 210/304 |
| 3,776,385 | 12/1973 | Maciula et al. | 210/512 R |
| 3,801,482 | 4/1974 | King | 204/180 R |

Primary Examiner—Frank A. Spear, Jr.
Assistant Examiner—Benoit Castel
Attorney, Agent, or Firm—Dowell & Dowell

[57] ABSTRACT

Treatment of fluid polluted with solid particles, for instance, from a dust removal or washing process, by pretreating the fluid to agglomerate the particles, then whirling the fluid to centrifugally concentrate the particles in a first fraction of the fluid and thereby substantially purifying a second fraction thereof, filtering the first fraction to recover the solid particles, collecting the particles and recirculating the purified fluid in the particle removal or washing process, the above treatment being carried out by apparatus having particular utility where the fluid is a liquid.

4 Claims, 3 Drawing Figures

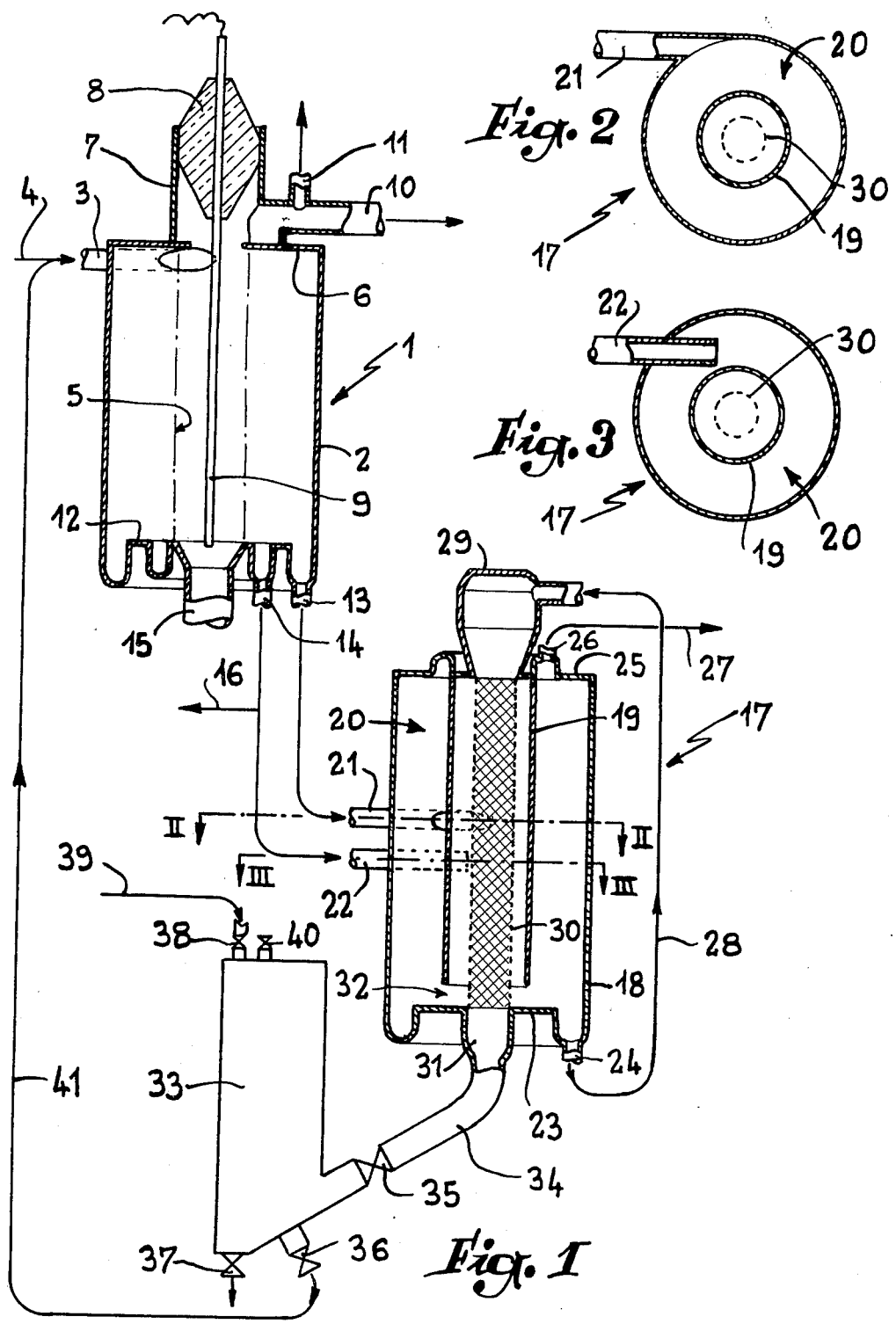

METHOD FOR SEPARATING SOLID POLLUTANTS FROM FLUIDS

The present invention relates generally to the treatment of gaseous or liquid fluids polluted by solid particles in suspension. More particularly, but not exclusively, it relates to the case of water coming from washing or dust removal and like installations and which contain particles separated from combustion gases or the like in installations of this type.

It is known that the direct discharge of water coming from industrial washing or dust removal operations etc. into the drains or rivers causes considerable danger of pollution. Thus, attempts have been made to find ways of treating this water for the purpose of eliminating the particles which they contain to a sufficient extent in order to obviate or at least considerably reduce the aforesaid dangers of pollution. To this end, it has been proposed to use filters, decanters and centrifuges. Nevertheless, hitherto these apparatus have not made it possible to solve the problem in a satisfactory manner. It is difficult to produce filters ensuring both good filtration and a sufficient flow of filtered water. Decanters are extremely bulky and virtually ineffective as regards fine and light particles. As regards centrifuges, they are expensive and their output is generally too low.

It is the object of the invention to solve the above problem in order to obtain by simple and inexpensive means, firstly water which is sufficiently clear so that it may be re-cycled in the washing, dust removal or like apparatus from which it comes, secondly a sludge which is concentrated enough to be made into pellets and conveyed without difficulty (or even possibly recycled in manufacturing processes when the particles constituting the latter have sufficient value.)

It is also the object of the invention to make it possible to extract from the treated waters, a small fraction which is clean enough to be discharged in the drains thus ensuring the progressive renewal of the mass of circulating water in the washing, dust removing and like apparatus and in the treatment installation according to the invention.

According to the invention, the water is firstly made to whirl at high speed in a preparatory apparatus in order that it circulates in the latter in the form of a revolving mass, for example a cylindrical mass, comprising an axial vacuum and located in this vacuum is an electrode having a appropriate potential for causing the agglomeration of the particles, whereas the centrifugal field is used simultaneously for removing the gases and foam as well as the floating particles from the water and for initiating purification by centrifugation, the fraction of partly purified water being able to be returned for use, then the water pre-treated in this manner is supplied to a concentrator inside which it continues to rotate, thus ensuring increased centrifugal concentration. The clear water leaving the central part of the concentrator is extracted and the muddy water is supplied to a filter forming a thickener, the filtered water being returned to the concentrator, whereas the thickened sludge is sent to a lock chamber which is evacuated periodically by pneumatic effect.

When the sludge leaving the lock chamber proves insufficiently concentrated, it may be returned to the inlet of the preparatory device, i.e. it may be recycled in the purification installation in order that its concentration is further increased.

The thickening filter may advantageously be disposed along the axis of the concentrator in order to simplify the installation and reduce the bulk thereof.

The accompanying drawings, given as an example, will make it easier to understand the invention, the features which it comprises and the advantages which it is able to provide.

FIG. 1 is a diagram with sections showing an installation for carrying out the invention.

FIGS. 2 and 3 are partial views on lines II—II and III—III (FIG. 1), in which solely the parts located in the plane of the section have been illustrated so as not to overburden the drawing.

The water to be treated comes from a washing, dust removal or like installation and it contains polluting particles which are to be removed. Furthermore, in certain cases, these particles have a commercial value and their recovery may be an advantage. This water is firstly sent to a first apparatus or preparatory apparatus which has been given the general reference 1. The preparatory apparatus 1 is constituted by a cylindrical body 2 comprising a tangential inlet 3 in its upper part, which receives the water to be treated, as shown by the arrow 4. The supply pressure of this water is sufficient for it to whirl rapidly inside the body 2 thus constituting a vortex with an empty axial space. The reference numeral 5 designates the free surface of the mass of water rotating inside the body 2. The upper end 6 of this body 2 comprises an axial shaft 7 closed by an insulator 8 through an axial electrode 9 passes. Naturally, the base 6 is perforated for the passage of the electrode 9, the diameter of the perforation nevertheless being less than that of the upper end of the axial vacuum defined by the surface 5 under normal operating conditions. The aforesaid shaft 7 is connected to an overflow pipe 10 to which is connected another pipe 11 leading to the outside.

The lower end 12 of the body 1 comprises two outlets 13 and 14 respectively located very close to the wall of the body 2 and on the contrary in the vicinity of the free surface 5. A central discharge pipe 15 is also provided.

The operation of the preparatory device is as follows : As above-mentioned, the water which arrives through the inlet 3, constitutes a hollow vortex inside the body 2. This vortex is subject to the electrostatic action of the electrode 9 connected to an appropriate high voltage source and provided to have an overall polarising and not ionising effect. Under the action of the field created by this electrode and of the Brownian movement, the particles in suspension in the water tend to agglomerate, whereas the centrifugal force concentrates them towards the wall 2. On the contrary, light foam appears on the free surface 5, where it bursts. The gas liberated in this way as well as the gas released from the liquid escape through the pipe 11, whereas the pipe 10 constitutes a safety measure for ensuring the discharge of the liquid in the case of an overflow. The pipe 13 supplies water having a high concentration of particles, whereas on the contrary, water leaves the pipe 14, which water is already partly purified and which may possibly be taken completely or partly, as shown by the arrow 16, to be re-cycled to the washing, dust removal or like installation from which the water introduced at 3 arrives.

The water leaving the pipe 13 and possibly all or part of the water coming from the pipe 14 is sent to a second apparatus or concentrator 17. The latter comprises an external cylindrical body 18 and an internal cylindrical body 19 coaxial with the former, these two bodies defining an annular space 20 therebetween. Opening into this space 20 and at the mid point of the body 18 are two inlets 21 and 22 respectively connected to the pipes 13 and 14. The first inlet 21 (FIG. 2) opens tangentially into the inside of the body 18 whereas on the contrary, the second inlet 22 is engaged in the latter in order to open out tangentially outside the inner body 19.

Provided in the base 23 of the body 18 is an outlet pipe 24 located close to the wall of the body in order to evacuate the liquid having the highest concentration of solid particles. In turn, the upper end 25 supports an outlet tube 26 but which, on the contrary, is disposed quite close to the inner wall 19 and outside the latter in order to recover the liquid from which virtually all the particles have been removed. This liquid is discharged in the direction of arrow 27 either for its re-use or to be emptied into the drains.

The liquid containing particles which leaves the lower pipe 24 is returned by a pipe shown diagrammatically at 28 to a vessel 29 supported by the upper end 25 above the two bodies 18 and 19. At its lower end, this vessel is connected to a filtering cylinder 30 disposed inside the body 19 and coaxially with respect to the latter, the lower end of this cylinder being fitted in a central tube 31 of the lower end wall 23. The cylinder 30 may be produced in any appropriate manner, for example by a finely perforated sheet metal, by a filtering sleeve appropriately retained against the action of the internal pressure etc.

It will be noted that a free space 32 is provided between the lower end of the body 19 and the end wall 23, this space being able to be continuous or interrupted, as necessary.

The operation of the concentrator 17 is as follows : The liquid coming from the pipe 13 and which contains a considerable quantity of particles, rotates rapidly in the annular space 20 such that it is separated into two layers, namely a first layer virtually devoid of particles and discharging through the pipe 26 and a second layer having a high concentration of particles which is returned to the vessel 29 to descend towards the pipe 31 passing through the filter 30. The latter allows a considerable fraction of clear liquid to pass, which liquid descends inside the body 19 in order to be re-cycled through the openings 32 in the central region of the annular space 20. The filter 30 thus operates as a thickener and it is finally a relatively thick sludge which reaches the lower pipe 31.

If arrangements have been made to return all or part of the partially purified liquid leaving the pipe 14, to the concentrator 17, this liquid arrives through the inlet 22 in the central region of the annular space 20 and almost all of it leaves at 26, the residual particles which it may possibly still contain being separated in order to be discharged through the pipe 24.

The sludge coming from the pipe 31 is sent to a pneumatic lock chamber 33 by a pipe 34. This lock chamber is constituted by a closed body (not shown in section in FIG. 1) provided at the bottom with a valve 35 corresponding to the pipe 34 and two discharge valves 36 and 37, whereas it is provided at its upper part with a valve 38 connected to a compressed air line 39 and to a valve 40 forming a flap valve and which opens when the internal pressure falls below atmospheric pressure. The valve 36 is connected to a pipe shown diagrammatically at 41 and which returns to the tangential inlet 3. The valve 37 opens into a sludge collecting basin not shown.

The operation of the lock chamber 33 is as follows: At the beginning of the operating cycle, since this lock chamber is empty, the valves 36, 37, 38 are closed and the valve 35 is opened. The sludge coming from the concentrator 17 accumulates in the lock chamber and raises the air pressure in the latter, this pressure constituting a convenient indication of the degree of filling. When the filling is deemed to be sufficient, the valve 35 is closed and the valve 37 opened. The lock chamber empties under the action of the compressed air in its interior which expands, the sludge being collected in the collecting basin provided for this purpose. Once the lock chamber is empty (possibly with the return of air through the valve 40), the cycle may recommence.

If it proves that the sludge which accumulates in the lock chamber 33 is too liquid, (which may be detected by the fact that this lock chamber fills too quickly, ) instead of discharging this sludge through the valve 37, it is the valve 36 which is opened at the same time as the valve 38 for the inlet of compressed air. The pressure of this air thus forces the sludge which is too liquid into the inlet 3 in order to re-cycle the latter.

As is apparent from the preceding description, the installation illustrated in FIG. 1 allows an effective treatment of the water coming from washing, dust removal and like installations whilst facilitating its re-use without any dangers. Naturally, the sludge entrains a certain quantity of water such that re-cycling is insufficient to ensure the supply of the installations in question. Conversely, it is possible to send part of the water leaving the pipe 26 of the concentrator into the drains.

It should be understood that the preceding description was given solely as an example and that it in no way limits the scope of the invention, from which one would not diverge if the details of the embodiments described were replaced by other equivalent measures. In particular, it will be understood that if the arrangement of the thickening filter along the axis of the concentrator 17 constitutes the preferred solution due to the fact that it reduces the bulk by using the available axial space, it may also be possible to provide a separate filter, interposed between the outlet pipe 24 of the concentrator and the inlet pipe 34 to the pneumatic lock chamber 33. Instead of returning the liquid sludge through the pipe 41 by means of compressed air, an appropriate pump may be used for this purpose. In FIG. 1, the axial space of the hollow vortex could be kept at a pressure greater than or less than atmospheric pressure. On the other hand, the parts 2 and 18 shown as cylindrical in the drawing, could be conical, frustoconical, etc.

Furthermore, and as mentioned at the beginning of the present description, although the invention is particularly intended for the treatment of water containing particles, it may also be used in the case of any other liquid.

I claim:

1. The method of separating solid particles from a liquid in which they are suspended to recover at separate outlets the particles and a clarified liquid effluent, the method being performed at a preparatory stage in a first vertically oriented cylindrical body having an axially disposed electrode to which a high voltage is applied to create an electrical field with respect to the body, and being performed at a concentrator stage in a second vertically oriented cylindrical body having an axially disposed hollow filter passing therethrough, and the second cylindrical body having a first inlet entering tangentially through its outer periphery and coupled to take liquid from the outer periphery of the first body, and the second body having a second inlet entering therethrough and opening tangentially thereinto at a location near the filter and coupled to take liquid from the first body near said electrode, including the steps of:

centrifuging a liquid mass containing the particles by introducing it tangentially under high pressure into said first cylindrical body to form a first vortex of the liquid around the electrode and out of electrical contact therewith, whereby the electrical field of the electrode agglomerates particles and the centrifugal force concentrates them toward the outer periphery of the first body while leaving a more clarified liquid near the electrode;

withdrawing from the first body above the first vortex the lighter particle, foam, and gases which become separated from the rotating liquid;

transferring liquid and particles from the preparatory stage to the first and second inlets of the concentrator stage;

centrifuging the liquid and particles in said concentrator stage by whirling them inside the second body to form a second vortex of liquid around said filter and spaced therefrom, whereby the centrifugal force concentrates particles outwardly of the centrifuging liquid to leave clarified liquid near said second vortex of the centrifuging liquid;

withdrawing liquid containing concentrated particles near the outer periphery of the second body and introducing it into one end of the hollow filter;

withdrawing a sludge of the particles from the other end of the hollow filter; and withdrawing clarified liquid from the second body near the second vortex of the liquid.

2. The method as set forth in claim 1, wherein the filtered particles as a mud are transferred into an air chamber, the additional step of withdrawing liquid from the air chamber and delivering it back into the liquid in the preparatory stage.

3. The method as set forth in claim 2, wherein the filtered particles as a sludge are transferred into an air chamber which is alternately filled and emptied.

4. The method as set forth in claim 3, wherein said sludge is recycled into the liquid in the preparatory stage when not sufficiently concentrated, the additional step of detecting the degree of concentration of the sludge by determining the time required for the air chamber to be filled.

* * * * *